United States Patent [19]
Habock et al.

[11] 3,919,607
[45] Nov. 11, 1975

[54] APPARATUS FOR DAMPING OSCILLATIONS IN A TRACK-BOUND PROPULSION VEHICLE HAVING A SYNCHRONOUS LINEAR MOTOR

[75] Inventors: Adolf Habock, Uttenreuth, Austria; Joachim Holtz, Erlangen, Germany

[73] Assignee: Siemens Aktiengesellschaft, Munich, Germany

[22] Filed: Aug. 29, 1974

[21] Appl. No.: 501,745

[30] Foreign Application Priority Data
Sept. 14, 1973 Germany............................ 2346457

[52] U.S. Cl. ................................................. 318/135
[51] Int. Cl.² ........................................... H02P 7/00
[58] Field of Search .......... 310/12, 13, 14; 318/135, 318/127, 132, 687

[56] References Cited
UNITED STATES PATENTS

| | | |
|---|---|---|
| 3,679,952 | 7/1972 | Pelenc ............................... 318/135 |
| 3,735,231 | 5/1973 | Sawyer ............................... 318/687 |
| 3,829,746 | 8/1974 | Van et al. ........................... 318/135 |

*Primary Examiner*—R. N. Envall, Jr.
*Attorney, Agent, or Firm*—Kenyon & Kenyon Reilly Carr & Chapin

[57] ABSTRACT

Apparatus for damping oscillations in a linear motor comprising an excitation winding and a traveling field winding supplied from a fixed a-c system in which means are provided for generating a transversal field in the air gap of the synchronous linear motor, with the generating means controlled by a control means providing an adjustable current thereto in response to a control signal supplied from a control device having as an input the output of measuring means developing a signal proportional to the oscillations in the propulsion vehicle drive.

19 Claims, 6 Drawing Figures

APPARATUS FOR DAMPING OSCILLATIONS IN A TRACK-BOUND PROPULSION VEHICLE HAVING A SYNCHRONOUS LINEAR MOTOR

BACKGROUND OF THE INVENTION

This invention relates to track bound propulsion vehicles having synchronous linear motor drives comprising an excitation winding and a traveling field winding fed from a fixed a-c system in general and more particularly to apparatus for reducing oscillations in such systems.

Linear motors are being given a great deal of consideration for use in propulsion systems for track bound vehicles particularly local traffic passenger railroads, rapid transit railroads and high performance rapid transit railways for velocities of up to 500 km/hr. Of the various types of linear motors available, a synchronous linear motor supplied by a fixed a-c system including a traveling field winding supplied from the fixed a-c system and an excitation winding is particularly desirable because of its high efficiency and high power factor.

A synchronous linear motor of this type may have a traveling field winding which is installed as a stator along the roadbed. In such cases because of the extraordinary length of the active stator it is sometimes referred to as a "long stator" synchronous motor. Synchronous linear motors of this general type can also have traveling field windings of a considerably shorter length arranged in the propulsion vehicle. In such a case a reaction rail with a magnetic reluctance periodically distributed in the travel direction is installed along the roadbed. The reaction rail along with the traveling field winding on the propulsion vehicle forms a linear synchronous motor of the homopolar type of construction also referred as a linear reactance motor.

In the operation of synchronous linear motors fed from fixed a-c systems electromagnetic oscillations or hunting which is superimposed on the translation of the vehicle can occur as verified by experience. Oscillations of this nature not only have a detrimental effect on the comfort of travel but can also cause the synchronous linear motor to fall out of synchronism and stop. Furthermore it can result in difficulties in starting so that the propulsion system is not set into motion at all. Measures typically used for the damping of oscillations in synchronous rotary machines, such as the use of damper windings or a solid rotor can not be used in a certain group of synchronous linear motors. The group to which this applies has a common characteristic that the excitation winding and traveling field winding together form the active part of the linear motor. For example such is the case in the homopolar linear motor or the reluctance motor. In addition known principles of active damping of oscillations using control loops such as that taught for synchronous rotary machines in German Offenlengungsschift No. 2,132,179 can not be directly applied to a synchronous linear motor coupled to a fixed a-c system. The reason for this is that in such fixed a-c systems the frequency and the a-c input voltage are fixed and there is no control means between the a-c system and the motor.

In view of these difficulties, it is the object of the present invention to provide means for overcoming instabilities or oscillations in propulsion vehicles of the type mentioned above. In particular it is the object of the present invention to damp or completely suppress any electromechanical oscillations which might arise.

SUMMARY OF THE INVENTION

The present invention is based primarily on the consideration that known principles of active oscillation damping using control loops can be applied to a synchronous linear motor if a suitable control means is created. According to the present invention this problem is solved by providing a transversal-field winding for generating a transversal field in the air gap of the synchronous linear motor. The transversal field winding is supplied, through control means, with a variable current whose magnitude can be adjusted in response to a control signal. The control signal is generated in a control device having an input from measuring means developing a quantity proportional to the power oscillations. Various types of measuring means can be used as long as they supply a quantity proportional to power oscillations For example means suppling a constant output in addition to the proportional quantity can be used. In such a case it is preferable that, for separating the time varying quantity, which is the only quantity of interest, a blocking capacitor or more preferably a bandpass filter tuned to the frequency range of the oscillations be provided. The input of this filter is then connected to the measuring means and its output connected to the input of the control device. Passive or active bandpass filters can be used. For example a bandpass filter comprising of series circuit of a series capacitor with two series resistors at the junction of which a shunt capacitor is connected can be used. If an active filter is desired an operational amplifier of high open loop gain having a series capacitor and resistor in its input and a parallel resistor and capacitor in its negative feedback loop can be used.

Examples of measuring means which can be used to furnish a quantity proportional to power oscillation are those sensitive to electrical power oscillations or those sensitive to a mechanical quantity which is dependent on changes in the electric power. Among the first type, for example, are electrical power measuring means placed in the connection between the a-c system and the traveling field winding. Since the voltage of the a-c system is generally constant these means can simply be current transformers arranged between the a-c system and the traveling field winding. Examples of the second type of measuring means are mechanical accelerometers fixed to the propulsion vehicle. In addition a pole position transducer can be used, measuring the position of the pole piece of the synchronous linear motor relative to the pole pitch of the stator installed on the roadbed.

In a homopolar type of synchronous linear motor where the excitation winding and the traveling field winding are arranged together in the immovable [stator] or movable [translator] part of the linear motor, a transversal field winding is preferably also arranged in this part. In accordance with a further feature of the present invention the excitation winding and traveling field winding of the linear motor are both placed on the same movable or immovable part and the transversal field winding also arranged on this same part. In this case the transversal field winding is also designed as a traveling-field winding and arranged physically displaced in a forward direction relative to the traveling field winding. The transversal-field winding is supplied with a variable a-c current through control means. Preferably in this case the transversal field winding is constructed as a three phase traveling field winding. In this embodiment it is advantageous if the transversal field winding is also supplied from the fixed a-c system through the control means. In such a case a-c control means are then provided as these control means. A control means of simple design is possible since its output frequency corresponds to its input frequency. This makes it particularly well suited to a fixed a-c system. Preferably such control means should be capable of operation in both energy flow directions. In order to create symmetrical control conditions the transversal field winding should be wound so that it is displaced with respect to the traveling field winding by half a pole pitch. Furthermore it should be possible to select the direction of current flow through the traveling field winding. A preferred manner of doing this is by using three phase transversal field windings having center taps which are Y connected.

If a type of synchronous linear motor is employed where the excitation winding is located on one part and a traveling field winding on the other part then the transversal field winding is preferably arranged in the excitor part. In accordance with a further embodiment of the present invention the synchronous linear motor has its excitation winding arranged on one part and its traveling field winding on the other part of the linear motor. The transversal field winding is then designed as an excitation winding and arranged physically displaced in the forward direction relatively to the excitation winding. In this case the transversal field winding is supplied with a variable d-c current through a control means. In such a case the transversal field winding can be supplied from an a-c system through the control means. In order to achieve symmetrical control conditions the winding can be wound such that it is displaced with respect to the excitation winding by a half a pole pitch. In order to expand the control range the control means can be designed so that it permits current flow in both directions permitting four-quadrant operation. A preferred form of control means is a rectifier circuit with controlled rectifiers in a bridge arrangement.

In both of these basic embodiments it is possible, through the arrangement of a transversal field winding in the synchronous linear motor, to change the mututal position of the excitation field and traveling field at any point and time. In order to do this current flowing to the transversal field winding through the control means is controlled as a function of a control signal. The control signal is furnished by a control device having as an input measured oscillations and providing an output which has a sign tending to damp or completely suppress oscillations. Through this arrangements starting difficulties are also eliminated.

DETAILED DESCRIPTION OF THE PREFERRED EMBODIMENT

Figure 1:
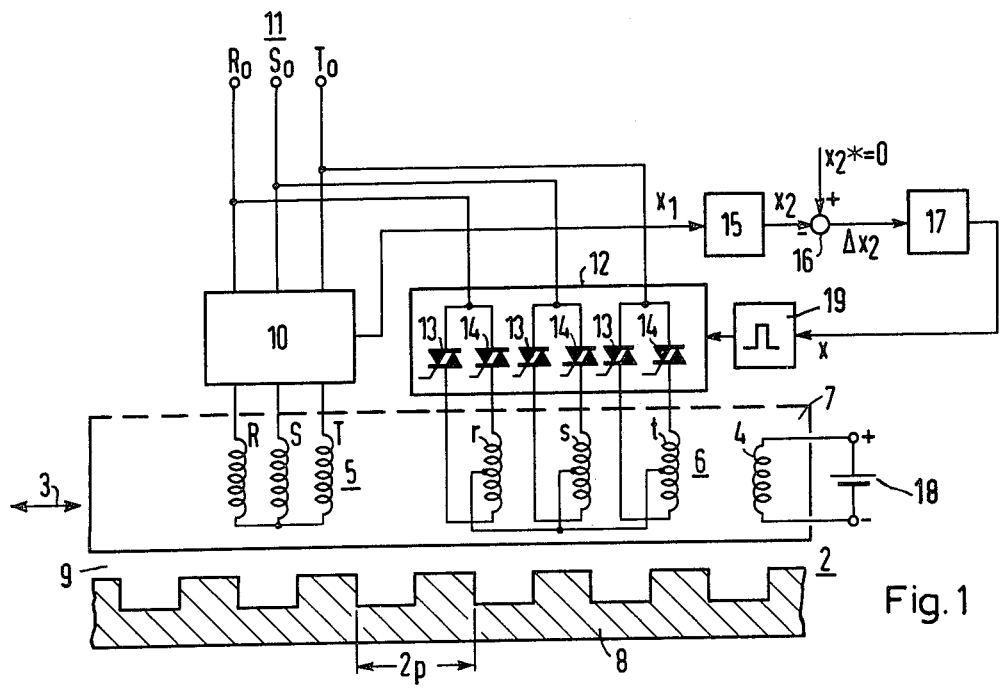
FIG. 1 is a schematic diagram of a synchronous linear motor of the homopolar type of construction having the apparatus of the present invention for oscillation damping installed.

FIG. 1 illustrates a synchronous linear motor 2 used for propelling a magnetic-suspension vehicle. The magnetic-suspension vehicle can be, for example, a propulsion vehicle for local traffic such as to the type referred to in Germany as H-bahn. Separate means not shown, will be provided for the suspension and lateral guidance of the vehicle. The linear motor comprises essentially an excitation winding 4 and a three phase traveling field winding 5 arranged to provide forward propulsion power. In accordance with the present invention it also includes a three phase transversal field winding 6 designed for stabilization power. In accordance with the illustrated embodiment the transversal field winding 6 is also designed as a traveling field winding. All three of the windings 4, 5 and 6 are arranged on a pole piece 7 of ferromagnetic material. The pole piece 7 along with the magnetic-suspension vehicle is maintained in a state of suspension by electromagnetic suspension means not shown. The pole piece is suspended directly above a reaction rail, for example, of iron in such a manner that an air gap 9 exists between the two. Reaction rail 8 has a rectangular lateral profile with a magnetic relectance which varies periodically with 2p. In the illustrated embodiment depressions have the same length as projections on the reaction rail 8. Reaction rail 8 serves as a track for the magnetic-suspension vehicle. The synchronous linear motor 2 as noted above, is a homopolar synchronous motor.

The traveling field winding 5 is coupled to the phase conductors $R_o$, $S_o$, and $T_o$ of a three phase system 11 through power measuring means 10. The a-c system is fixed i.e., its frequency is maintained at, for example 50 or 60 Hz and its voltage at, for example, 380 V. The excitation winding 4 is supplied by d-c current source 18 whose d-c voltage is either constant or can be set using a control arrangement. The d-c source can be developed by rectifying the voltage from the a-c source 11 in a controlled or uncontrolled rectifier in conventional fashion.

When so excited, the traveling field winding 5 supplies the forward propulsion power for the magnetic-suspension vehicle directly from a fixed a-c system 11. Experience has shown that if nothing is done oscillations will occur in the forward propulsion direction i.e., in the direction of the double arrow 3. The oscillations are superimposed on the forward propulsion motion and felt as a disturbance during travel. In addition they can cause an undesired stopping of the linear motor 2.

In order to eliminate these oscillations, the transversal field winding 6 is provided. Along with the control circuits to be described below it forms an arrangement for damping oscillations. It is advantageous if, as shown, the transversal field winding 6 is also supplied from the fixed a-c system 11 through control means 12. Control means 12 are installed to permit the transversal field to be varied. With this arrangement the transversal field has the same frequency as the traveling-field with an adjustable field strength. The three phase control can, as illustrated, be designed for an extension of control range through means of current reversal in the sense of a phase shift by 180°. Thus each of the three phase lines $R_o$, $S_o$, and $T_o$ is connected through two sets of controlled rectifiers of reverse polarity. Each of the transversal field windings 6 has a rectifier device 13 coupled to one end and another rectifier device 14 connected to the other end. Each of the windings has a center tap with all center taps connected together in a Y configuration and to neutral. The controlled rectifier devices 13 and 14 can be parallel connected thyristors with opposite polarity or more preferably will be triacs. The control means 12 need be designed only for the stabilization power which is approximately 2 to 10 percent of the forward propulsion power.

The power measuring means 10, in the case of a constant a-c voltage, can simply be current transformers. The measuring means 10 delivers a signal designated $x1$ containing a d-c component and in addition thereto a voltage quantity proportional to the oscillations. As a result the measuring means 10 is a means for measuring for power oscillations. The signal x1 is an input to a bandpass filter 15 tuned to the natural oscillation frequency of the synchronous linear motor 2. Generally the oscillation frequency is lower than the frequency of the a-c supply system. Its exact frequency depends on the mechanical construction of the propulsion vehicle and may be the range of approximately 1 Hz.

Bandpass filter 15 can be a passive filter comprising two series resistors at the junction of which a shunt capacitor is coupled with a series capacitor preceding the first series resistor. However, an active filter comprising an operational amplifier having at its input a resistor and capacitor in series and negative feedback made up of a resistor and capacitor in parallel may be used.

Bandpass filter 15 provides an output signal $x2$ which consists of that part of the signal $x1$ representing the oscillation frequency. The d-c portion of the signal $x1$ is blocked by the filter. The output $x2$ from the filter 15 is provided to a summing junction 16 at the input of a controller 17. At the summing junction 16 the quantity $x2$ is substracted from a value $x_2 *$ equal to zero, the desired oscillation value. Any difference from the desired value i.e., any difference from zero, is provided to the controller 17 as a signal $\Delta x2$. Typically the controller 17 will be an operational amplifier integrator control which changes its output as a function of its input until its input becomes zero. The output therefrom is a control signal designated x which provided as an input to a control unit 19 which develops firing pulses for the rectifiers 13 and/or 14. Controls of this nature are well known in the art. Firing pulses control the conduction phase angle of the rectifiers and thus of the current in the transversal field winding 6. Selecting one of the rectifiers 13 and 14 for firing selects the direction of current flow thus allowing control in both directions.

Figure 2:
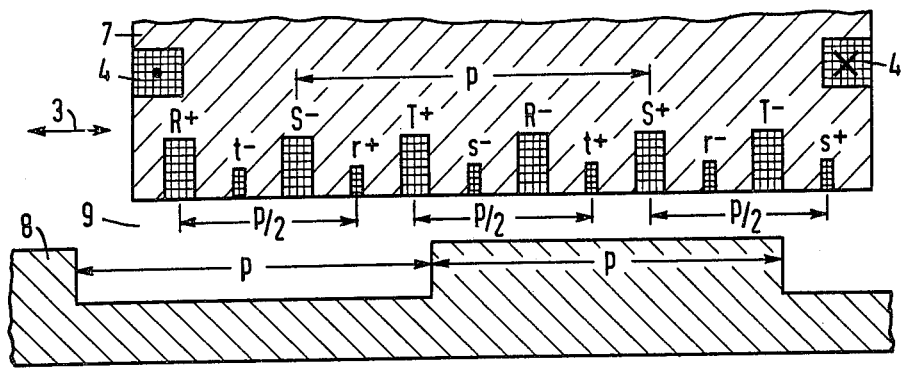
FIG. 2 is a cross sectional elevation view of the transversal field windings in the motor of FIG. 1.

FIG. 2 is an elevation view in cross section showing the winding arrangement for the synchronous linear motor of FIG. 1. Pole piece 7 has an essentially rectangular bottom surface area into which are machined a plurality of slots extending perpendicular to the forward propulsion direction, i.e., perpendicular to the direction of the double arrow 3 and to the plane of the paper in FIG. 2. Six slots having a larger rectangular cross section and six slots having a smaller rectangular cross section are provided. The larger slots are separated from each other by a distance $p/3$ as are the smaller slots, where $p$ is the pole pitch. The rectangular partial pieces of the reaction rail 8 also have a distance $p$ from each other. The relationship of the smaller slots to the larger slots is that they are displaced from each other by a distance $p/6$. The six larger slots are used for receiving the traveling field winding 5 and the six smaller slots the transversal field winding 6.

As illustrated on the figure the larger slots accomodate the phase windings R, S, and T of the traveling field winding 5. The axis of each of these windings is perpendicular to the forward propulsion direction. The cross section $R^+$ and $R^-$, both perpendicular to the plane of the paper and at a spacing of p from each other for the phase R, are shown. The sections $R^+$ and $R^-$ are joined at the two lateral surfaces of the pole piece 7, i.e., above and below the plane of the paper of FIG. 2. The same is true for the $S^-$ and $S^+$ for phase winding S which is displaced by $p/3$ in the forward propulsion relatively to the phase winding R. The sections $T^+$ and $T^-$ are similarly arranged and are displaced by another distance of $p/3$ with respect to the phase winding S. From this figure the leads of the three phase windings R, S and T are not visible. These phase windings R, S and T form a three phase system producing a magnetic field traveling opposite to the forward propulsion direction when fed with a-c current.

The transversal-field winding 6 is also a traveling field winding and thus has a similar structure to the traveling field winding 2. The only difference is that it is displaced with respect the latter by a distance $p/2$ in the forward direction and has smaller dimensions because of the lower power at which it operates. The phase windings $r$, $s$ and $t$ of the transversal field winding 6 are located in the smaller slots. As with the traveling field winding the axis of each phase is therefore also perpendicular to the double arrow 3. The sections $r^+$ and $r^-$ of winding $r$, the sections $s^+$ and $s^-$ of winding $s$ and $t^+$ and $t^-$ of the winding t are shown in cross section. The section $r^+$ of winding $r$ is displaced by a distance $p/2$ in the forward propulsion direction with respect to the section $R^+$ of the corresponding winding R. The section $r^-$ is at a distance p from the section $r^+$. Both sections $r^+$ and $r^-$ are joined together above and below the plane of the paper. Similarly the sections $s^+$ and $s^-$ and the sections $t^+$ and $t^-$ are also joined. The phase winding $s$ is displaced with respect to the phase winding $r$ by $p/3$ and the phase winding t with respect to the phase winding s by another $p/3$ in the forward propulsion direction. As a result the phase windings $r$, $s$, and $t$ also form a three phase system producing a traveling field a-c field when an a-c current is supplied thereto. If the supply of current is in phase with that of the traveling field winding 5 the traveling field of the transversal field winding is displaced with respect to the traveling field of the traveling field winding 5 by $p/2$ in the forward propulsion direction. By using the control means 12 of FIG. 1 the strength of the additional traveling field or transversal field can be adjusted. As noted above it is varied as a function of the oscillations and instabilities of the synchronous linear motor 2 in such or manner to reduce a completely suppress these oscillations.

Also shown on FIG. 2 are two additional cross-wise slots on the front and rear sides of the pole piece on which are located the excitation winding 4. The remainder of the excitation winding is found in two further sections situated above and below the plane of the paper. Thus, the axis of the excitation winding is also perpendicular to the forward propulsion direction and points in the direction of reaction rail 8. It has an inside diameter of approximately $2p$. D-C flow in the winding is as indicated on the drawing by a dot and a cross respectively.

Figure 3:
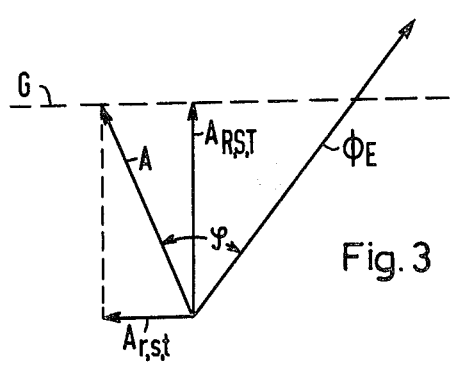
FIG. 3 is a vector diagram helpful in understanding the operation of the systems of FIGS. 1 and 2.

FIG. 3 is helpful in understanding the control behavior of the synchronous linear motor of FIGS. 1 and 2. The excitation flux resulting from the current in the excitation winding 4 is modulated in intensity by the locally variable magnetic reluctance of the reaction rail 8 at the frequency of the fixed a-c system 11 during synchronous operation due to the motion of the pole piece 7 relative to the reaction rail 8. The a-c component of the excitation flux is designated as $0_E$. The second vector shown on FIG. 3 is the vector $A_{R,S,T}$ which is the ampere turns vector caused by the a-c current in the traveling field winding 5. A smaller ampere turn vector $A_{r,s,t}$ generated by the a-c current of the same frequncy in the transversal winding 6 also occurs. Because of the mutual physical displacement of the windings 5 and 6 by $p/2$ the vectors $A_{R,S,T}$ and $A_{r,s,t}$ are at right angles to each other. Geometric addition yields a resultant ampere turns vector A. The vector A forms an angle $\phi$ with the excitation flux vector $0_E$. This angle is a measure of the advance of the synchronous linear 2. The advance is obtained as the outer vector product of A and $0_E$. It reaches a maximum when the angle $\phi$ is equal to 90°.

The control means 12 permits varying the ampere turns vector $A_{r,s,t}$. If this vector is changed while the ampere turns vector $A_{R,S,T}$ is held constant the resultant vector A moves on the straight line G. If a disturbance such as a gust of wind occurs in operation it will manifiest itself primarily as a change in the ampere turns vector $A_{R,S,T}$. Without existence of the control loop and the transversal field winding 6 the synchronous linear motor would oscillate or hunt continously about its stationary operating point. These oscillations would be transmitted to the ampere turns vector $A_{R,S,T}$. However in the present system the control loop is designed so that it changes the magnitutde of the ampere turns vector $A_{r,s,t}$ very fast to cause the absolute value of the vector product A and $0_E$ to reach a point where it no longer contains any components of the oscillation frequency of the synchronous motor but again assumes a constant value. As a result the advance also remains constant and mechanical oscillations with respect to forward propulsion motion are avoided.

Figure 4:
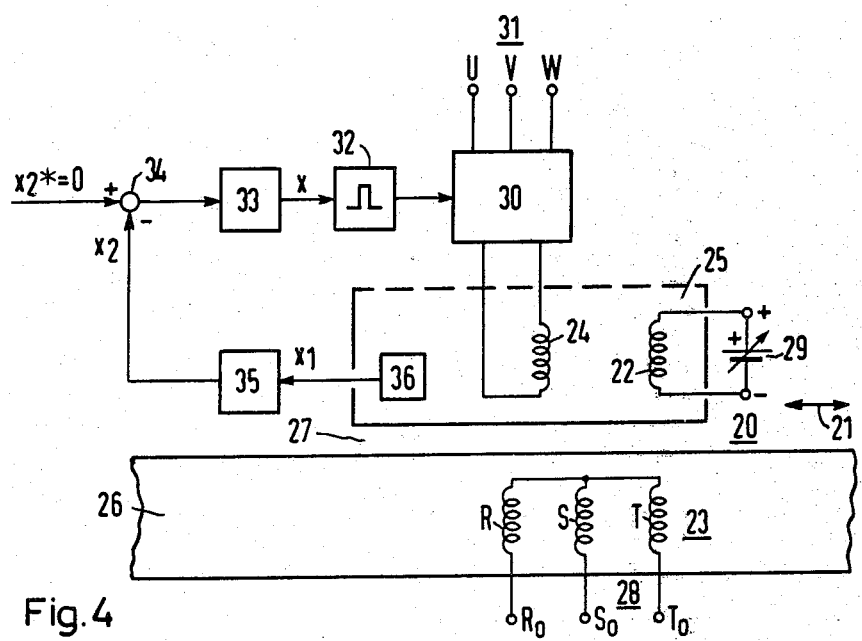
FIG. 4 is a diagram similar to FIG. 1 for a synchronous linear motor where the excitation winding is in one part and the traveling field winding in the other part.

FIG. 4 shows a second embodiment of the invention used with the synchronous linear motor for a magnetic suspension vheicle of the type in which the traveling field winding is in one part and the excitation winding in the other part. Once again the magnetic suspension vehicle is moved in the direction of the double arrow 21. The linear motor 20 comprises an excitation winding 22, a three phase traveling field winding 23 designed for forward propulsion power, and, in accordance with the present invention, a transversal field winding 24. In this case the transversal field winding is designed as an excitation winding. It along with the excitation winding 22 is located in a pole piece 25 made of ferromagnetic material. The pole piece 25 is held suspended above the track 26 by the electo-magnetic suspension means of the propulsion vehicle. The traveling field winding 23 is installed in a stationary manner on the track 26 and extends over long distances in the travel direction. As a result the traveling field winding 23 is what is known in the art as a "long stator." Between the track 26 and the bottom surface of the pole piece 25 is an air gap 27 of essentially constant width.

The three phase traveling field winding 23 is connected through a switch (not shown) to the three phases $R_o$, $S_o$, and $T_o$ of the fixed three phase system 28 having a normal line frequency of 50 or 60 Hz. In order to supply the excitation winding 22 a d-c source 29 is provided. Typically this will be a source in which the d-c current can be controlled. With this arrangement the traveling field winding produces, in the air gap 27, a traveling field which travels in one of the two directions indicated by double arrow 21. In order to avoid starting difficulties and oscillations in the forward propulsion, as well as unintended stalling in operation, a control loop is again provided. Among its components is the transversal field winding 24. The transversal field winding 24 is supplied with a variable d-c current through control means 30 which have as a power input a supplemental power source. This supplemental power source can be fed for example form the phases U,V,W of a three phase system. Particularly suited as control means 30 is a rectifier made up of a plurality of controlled switching or rectifier devices such as transistors or thyristors arranged in a bridge circuit. It need be designed only for a fraction of the excitation power such as 5 percent of the excitation power. Control means 30 has as an input the output of a control unit 32 of conventional design for delivering firing pulses in a predetermined firing sequence to operate the controlled rectifier or the like so that the phase and frequency is adjustable. The firing pulses are developed in response to a control signal $x$ which is the output signal of a control device 33. As with the control device 17 of FIG. 1, device 33 may be an operational amplifier integrator. At its input is a summing junction 34 where a quantity $x2$ is compared with a quantity $x2^*$ which is held equal to zero. In other words the quantity $x2$, which represents the oscillations, is desired to be maintained at zero. The error developed at summing junction 34 will cause the control 33 to provide an output signal $x$ which will act in a manner so as to bring $x2$ to zero. The signal $x2$ is obtained from a bandpass filter 35 of design similar to bandpass filter 15 of FIG. 1. Filter 35 obtain its input $x1$ from a measuring means 36. This measuring means 36 can provide an output variable or signal $x1$ which is an indication of pole position, the acceleration, or the active power of the linear motor 20. In the illustrated embodiment a mechanical measuring means 36, such as an accelerometer, which is fixed to the magnetic suspension vehicle is preferred. In the manner described above the bandpass filter 35 having a center frequency tuned to the natural oscillation frequency of the propulsion vehicle passes only those frequency components representing oscillation of the vehicle. Thus, these alone will contribute to the damping of the oscillation. In this manner the control loop insures that frequency components in the control signal $x1$ from the synchronous linear motor 20 are caused to be brought to a preset value $x2^* = 0$ i.e., the oscillations in the range of the resonant frequency of the linear motor 20 are damped or even completely suppressed.

Figure 5:
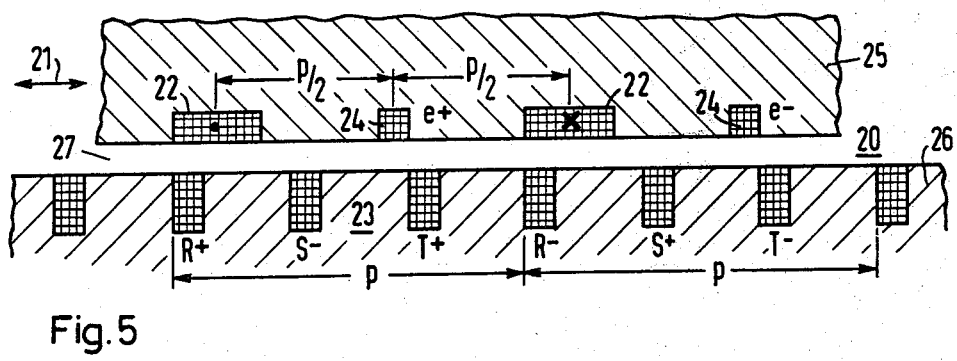
FIG. 5 is a cross sectional elevation view illustrating the winding arrangements in the motor of FIG. 4.

FIG. 5 shows a cross sectional elevation view of the winding arrangement of the motor of FIG. 4. Movable pole piece 25 has a smooth bottom surface into which a number of slots are formed extending perpendicular to the double arrow 21. Into two larger slots formed therein spaced a distance apart equal to the pole pitch $p$ the excitation winding 22 is inserted. Its section is shown in cross-hatched form on the Figure. The excitation winding is a rectangular shape as described above in connection with FIG. 2 with its coil axis perpendicular to the track 26. The transversal winding is situated in two smaller slots similarly spaced a distance equal to the pole pitch $p$. Its displacement relative to the excitation winding 22 is by half a pole pitch $p/2$ in the forward propulsion direction. Its sections $e+$ and $e-$ are shown cross-hatched. The transversal field winding 24 is of the same rectangular shape as the excitation winding 22 with its coil axis similarly perpendicular to the track 26. It is possible to accommodate a further excitation winding in the pole piece 25. In such a case it can be displaced by the pole piece spacing $p$ relative to the excitation winding 22 in the forward direction. In such a case a further transversal field winding can also be provided interleaved in the further excitation winding in exactly the same manner as the transversal winding 24 is with respect to the excitation winding 22.

The traveling field winding with the phases R, S, and T is shown in the track 26. Each of the windings R, S and T are of rectangular shape and extend parallel to the direction of travel 21 as illustrated in FIG. 5. The diameter of each winding in the forward propulsion direction is equal to the pole pitch $p$. The cross section $R^+$ and $R^-$ of the winding R perpendicular to the plane of the paper and at a spacing $p$ are shown on FIG. 5. Similarly the sections $S^+$ and $S^-$ of the winding S, displaced with respect to the phase winding R by $p/3$ in the forward propulsion direction are shown. The winding T with the sections $T^+$ and $T^-$ is shown displaced by another $p/3$ with respect to the phase winding S. These windings R, S and T produce a magnetic field traveling in the forward propulsion direction when energized by a-c current.

Figure 6:
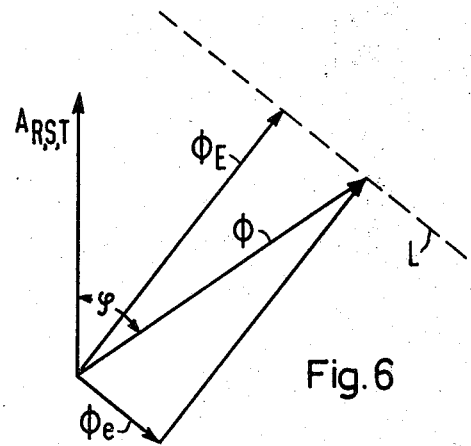
FIG. 6 is a vector diagram helpful in understanding the operation of the embodiment of FIGS. 4 and 5.

The vector diagram of FIG. 6 is helpful in understanding the control behavior of the synchronous linear motor of FIGS. 4 and 5. The excitation flux resulting from current flow in the excitation winding 22 is designated as $\emptyset_E$. To this a further excitation flux $0_e$ resulting from the transversal field winding 24 is added. Because of the physical displacement of the excitation winding 22 and the transversal field winding 25 by a distance of $p/2$, the vectors $0_E$ and $0_e$ are orthogonal to each other. By means of vector adition a resultant excitation flux $0$ is obtained. This vector $0$ meakes an angle $\phi$ with the vector $A_{R,S,T}$ the ampere turns vector formed by the traveling field winding 23. Once again the angle $\phi$ is a measure of the advance of the synchronous linear motor. The advance is obtained as the outer vector product of the quantities $0$ and $A_{R,S,T}$. If adjustment of the control means 30 is changed, current in the transversal field winding 24 changes and thereby the supplemental excitation flux $0_e$. The resultant excitation flux vector $0$ moves on the straight line L shown in dotted lines. If the ampere turns vector $A_{R,S,T}$ changes due to a disturbance, the supplemental excitation field $0_e$ is also caused to change because of the control loop. This change is in a direction which will result in damping of the oscillations.

Thus, apparatus for damping oscillations in a propulsion vehicle propelled by a traveling field linear motor has been shown. Although specific embodiments have been illustrated and described, it will be obvious to those skilled in the art that various modifications may be made without departing from the spirit of the invention which is intended to be limited solely by the appended claims.

What is claimed is:

1. In the trackbound propulsion vehicle driven by a synchronous linear motor having an excitation winding and a traveling field winding supplied from a fixed a-c system, means of generating a transversal field in the air gap for the synchronous linear motor comprising:
   a. a transversal field winding;
   b. control means to supply said transversal field winding with and variable current, in response to a input signal;
   c. means to measure the power oscillations in said linear motor and to provide an output indicative thereof; and
   d. means having the output of said measuring means as an input and providing a control signal to said control means.

2. Apparatus according to claim 1 and further including a bandpass filter between said measuring means and said means providing a control signal, said bandpass filter tuned to the range of oscillation frequencies expected in said propulsion vehicle.

3. Apparatus according to claim 2 wherein said bandpass filter comprises a capacitor coupled in series with two series resistors with a shunt capacitor coupled between the junction of said resistors.

4. Apparatus according to claim 2 wherein said bandpass filter comprises an operational amplifier having an input circuit comprising a capacitor in series with a resistor and having a parallel resistor and capacitor in its negative feedback circuit.

5. Apparatus according to claim 1 wherein said measuring means comprises means for measuring electrical power arranged in the connection between said fixed a-c system and the traveling field winding of said linear motor.

6. Apparatus according to claim 1 wherein said measuring means comprises a current transformer arranged between said fixed a-c system and the traveling field winding of said linear motor.

7. Apparatus according to claim 1 wherein said measuring means comprise an accelerometer fixed to the propulsion vehicle.

8. Apparatus according to claim 1 wherein in said measuring means comprises a pole position transducer measuring the position of the pole piece of the synchronous linear motor relative to the pole pitch of the stator installed on the roadbed.

9. Apparatus according to claim 1 wherein the excitation winding and traveling field winding of said synchronous linear motor are both arranged on the same one of the movable and immovable part of the linear motor and wherein said transversal field winding is arranged on the same part of the synchronous linear motor as said excitation winding and traveling field winding, said transversal field winding being in the form of traveling field winding physically displaced in the forward propulsion direction with respect to the traveling field winding, and wherein said control means comprise means for supplying a variable a-c current.

10. Apparatus according to claim 9 wherein said control means are installed between the fixed a-c system and said transversal field winding.

11. Apparatus according to claim 9 wherein said transversal field winding is displaced with respect to said traveling field winding by half a pole pitch.

12. Apparatus according to claim 9 wherein said control means comprise an a-c control means.

13. Apparatus according to claim 12 wherein said a-c control means are capable of operating said transversal field selectively to lead said traveling field and to lag said traveling field.

14. Apparatus according to claim 13 wherein said transversal field winding is a three phase filed winding having phase windings which are provided with Y connected center taps.

15. An apparatus according to claim 1 wherein the excitation winding of said synchronous linear motor is arranged on one part and the traveling field winding on the other part of the linear motor and wherein said transversal field winding is arranged on the same part as the excitation winding and is designed as an excitation winding physically displaced with respect to the excitation winding in the forward propulsion direction, said control means supplying said transversal field winding with a variable d-c current.

16. Apparatus according to claim 15 wherein said transversal field winding is supplied from an a-c system through said control means.

17. Apparatus according to claim 15 wherein said transversal field winding is displaced with respect to said excitation winding by half a pole pitch.

18. Apparatus according to claim 15 wherein said current control means comprise a rectifier bridge made up of controlled semi-conductor rectifiers.

19. Apparatus according to claim 15 wherein said contol means is arranged for four-quandrant operation.

* * * * *